United States Patent [19]

Loup

[11] Patent Number: 4,475,568
[45] Date of Patent: Oct. 9, 1984

[54] PRESSURE REDUCING AND REGULATING VALVE

[75] Inventor: Ronald L. Loup, Clarkston, Mich.

[73] Assignee: Koomey, Inc., Brookshire, Tex.

[21] Appl. No.: 478,125

[22] Filed: Mar. 22, 1983

Related U.S. Application Data

[63] Continuation-in-part of Ser. No. 339,554, Jan. 15, 1982, Pat. No. 4,444,216.

[51] Int. Cl.³ ............................................. G05D 16/00
[52] U.S. Cl. ................................ 137/116; 137/625.35; 251/284; 74/424.8 R; 267/177
[58] Field of Search ..................... 137/116, 115, 625.35, 137/116.3, 505.41, 505.42; 251/284; 74/424.8 R, 424.8 VA; 411/534; 267/175, 177

[56] References Cited

U.S. PATENT DOCUMENTS

| | | | |
|---|---|---|---|
| 3,917,220 | 11/1975 | Gilmore | 251/86 |
| 4,094,337 | 6/1978 | Robinson | 137/505.42 |
| 4,362,449 | 12/1982 | Hlinsky | 411/534 |

Primary Examiner—Martin P. Schwadron
Assistant Examiner—James R. Shay
Attorney, Agent, or Firm—Fulbright & Jaworski

[57] ABSTRACT

A pressure reducing and regulating valve having a body with a body cavity and a seal container movable in the cavity. The container includes primary and vent seals. At least one flow plate is positioned in the body adjacent the container and includes primary, secondary and vent ports. The improved seal container has the primary and vent seals positioned in the container on opposite sides of the central axis of the container, allowing the container and thus the body to be of a smaller size, thereby reducing the pressure forces applied against the interior of the body. The primary and vent seals are spaced on opposite sides of the central axis at locations for reducing the side loading forces acting around the central axis as the container is moved. An adjustable screw engages a spring for adjusting the pressure flow through the valve and the screw includes one or more metal washers on each side of a shoulder on the screw coated with low friction material whereby the shoulder can be easily backed off from engagement with the body.

10 Claims, 13 Drawing Figures

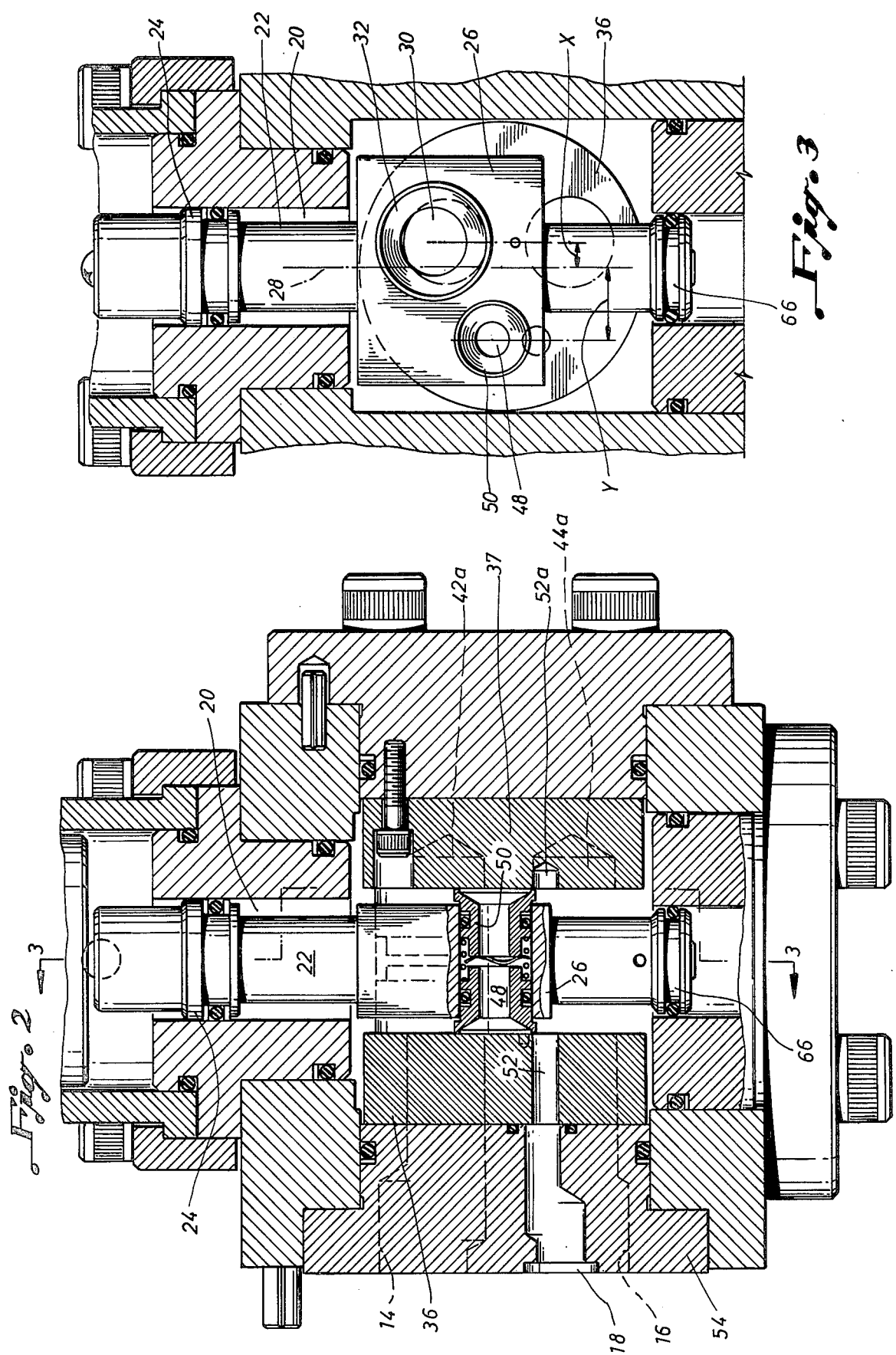

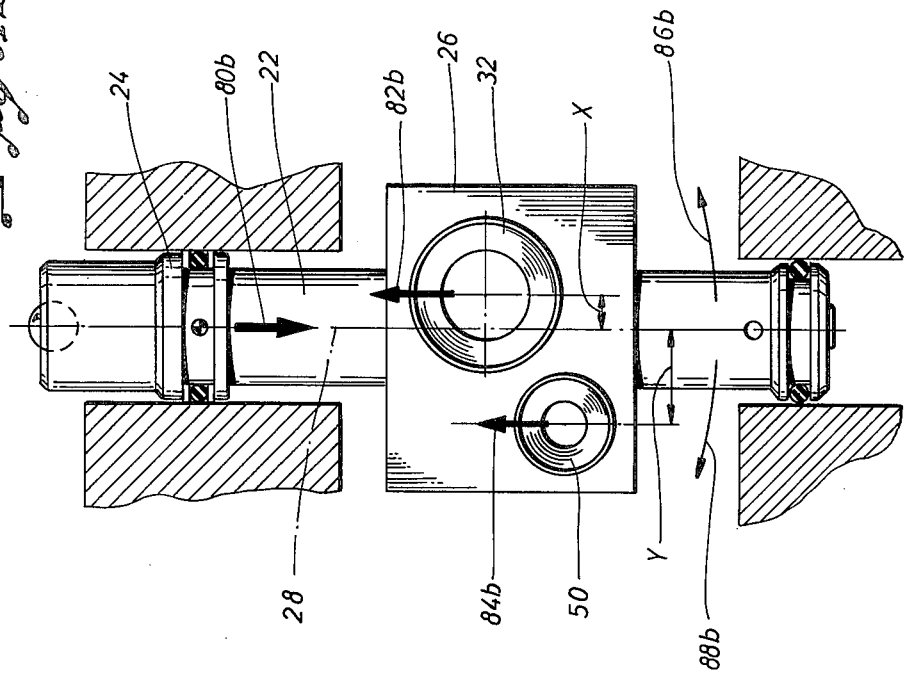
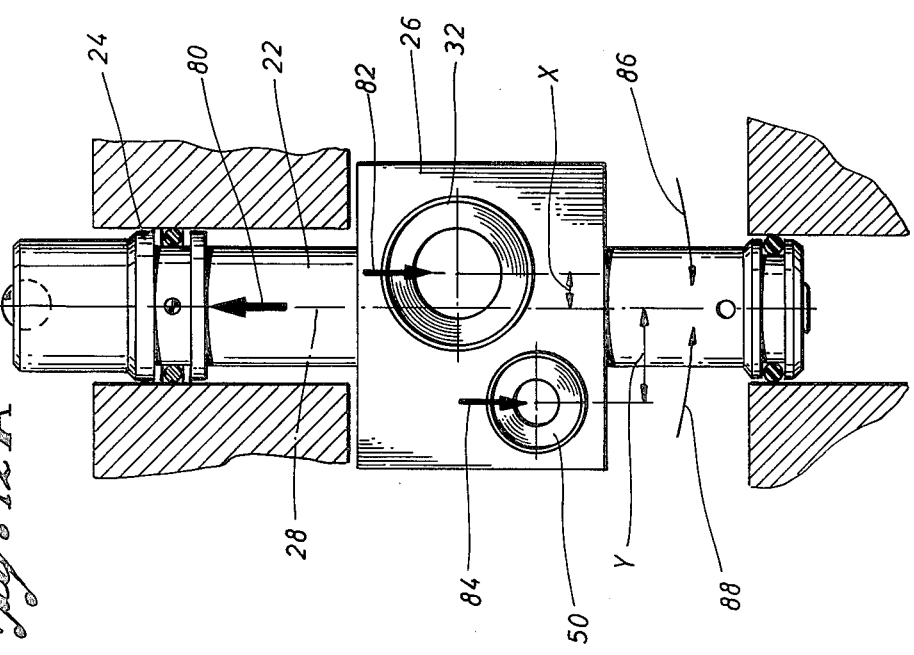

PRESSURE REDUCING AND REGULATING VALVE

CROSS-REFERENCE TO RELATED APPLICATIONS

This application is a continuation in part of an application entitled "Pressure Reducing and Regulating Valve", Ser. No. 339,554, filed Jan. 15, 1982, now Pat. No. 4,444,216.

BACKGROUND OF THE INVENTION

It is well known to provide a pressure reducing and regulating valve which is manually or power operated to move a seal container between an inlet, an outlet and vent ports in response to fluid pressure.

However, it is desirable to minimize the size of the valve as this reduces its weight and cost. And more importantly, since a valve is a pressure vessel and the internal area of the valve is subjected to pressure, it is particularly desirable to minimize the size of the seal container which determines the size of the body and thus the magnitude of the internal expanding forces on the valve body. This becomes particularly important if the valve is to be face mounted such as subplate or manifold mounting. Conventionally, the primary and vent seals are positioned on the center line or central axis of the seal container. However, such axial placement of the seals require that the flow plate size accomodate the sum of the seal diameters and the stroke.

The present invention minimizes the size of the seal container by positioning the primary and vent seals on opposite sides of the central axis of the container, which allows the container and thus the valve to be of a smaller size, thereby reducing the pressure forces applied against the interior of the body. However, this non-axial placement of the seals creates force moments about the central axis due to the off-center drag of the seals and creates side loading on the container. The present invention reduces the side loading forces acting about the central axis by offsetting the primary and vent seals at distances from the central axis to compensate for the force moments.

Another problem in regulating and reducing valves is that the actuating means generally includes an adjustable screw engaging spring means acting against the seal container for adjusting the fluid flow through the valve. The screw includes a shoulder which is positioned to engage the body at each end of travel of the screw in opposite directions. If the adjusting screw overruns its limit of travel in each direction it binds on the body and is difficult to retract. The present invention is directed to utilizing one or more metal washers on each side of the shoulder coated with a low friction material whereby the shoulder can be easily backed off from its engagement with the body.

SUMMARY

The present invention is directed to a pressure reducing and regulating valve having a body with a cavity in which an improved seal container is movable in which the container includes primary and vent seals. At least one flow plate in the body is positioned adjacent the container and includes primary, secondary and vent ports. The improved seal container locates the primary and vent seals on the container on opposite sides of the central axis of the container thereby allowing the container to be of a smaller size thereby reducing the pressure forces applied against the interior of the body. This is particularly advantageous by allowing the smaller size valves to be used for face mounting and still maintain adequate sealing of its parts.

Yet a further object of the present invention is wherein a port plate mates with a flow plate having ports communicating with the ports in the flow plate and the outer face of the port plate includes face seals for subplate mounting.

A still further object of the present invention is wherein the primary and vent seals are spaced on opposite sides of the central axis at locations for reducing the side loading forces of the seals acting around the central axis as the container is moved.

Yet a still further object of the present invention is wherein the smaller vent seal is spaced further from the central axis of the container than the larger primary seal. Preferably, the vent seal and primary seal are spaced from the central axis distances which provide balance side loading moments when the pressure at the secondary port is the mean regulated pressure.

Still a further object of the present invention is the provision of a second flow plate in the body positioned adjacent to the seal container on the side opposite the first flow plate and having primary, secondary and vent ports.

Still a further object of the present invention is the improvement in a pressure reducing and regulating valve in which spring means act against the container in a direction to increase the fluid flow through the valve, and an adjustable screw engages the spring means for adjusting the compression in the spring means and a shoulder is provided on the screw positioned to engage the body at each end of travel in opposite directions. At least one metal washer is provided on each side of the shoulder coated with a low friction material whereby the shoulder can be easily backed off from its engagement with the body in the event that the screw overruns its limit of travel and binds against the body. Preferably, the washers are coated with a low friction plastic material such as a fluorocarbon.

Other and further objects, features and advantages will be apparent from the following description of a presently preferred embodiment of the invention, given for the purpose of disclosure and taken in conjunction with the accompanying drawings.

BRIEF DESCRIPTION OF THE DRAWINGS

FIG. 2 is a fragmentary elevational view, in cross section, of the valve of the present invention shown in the vented position, FIG. 3 is a cross-sectional view taken along the line 3—3 of FIG. 2, FIG. 12A is a schematic of the seal container showing the drag forces and moments created as the seal container moves upwardly, and FIG. 12B is a schematic similar to FIG. 12A but showing the seal container moving downwardly.

DESCRIPTION OF THE PREFERRED EMBODIMENT

Figure 1:
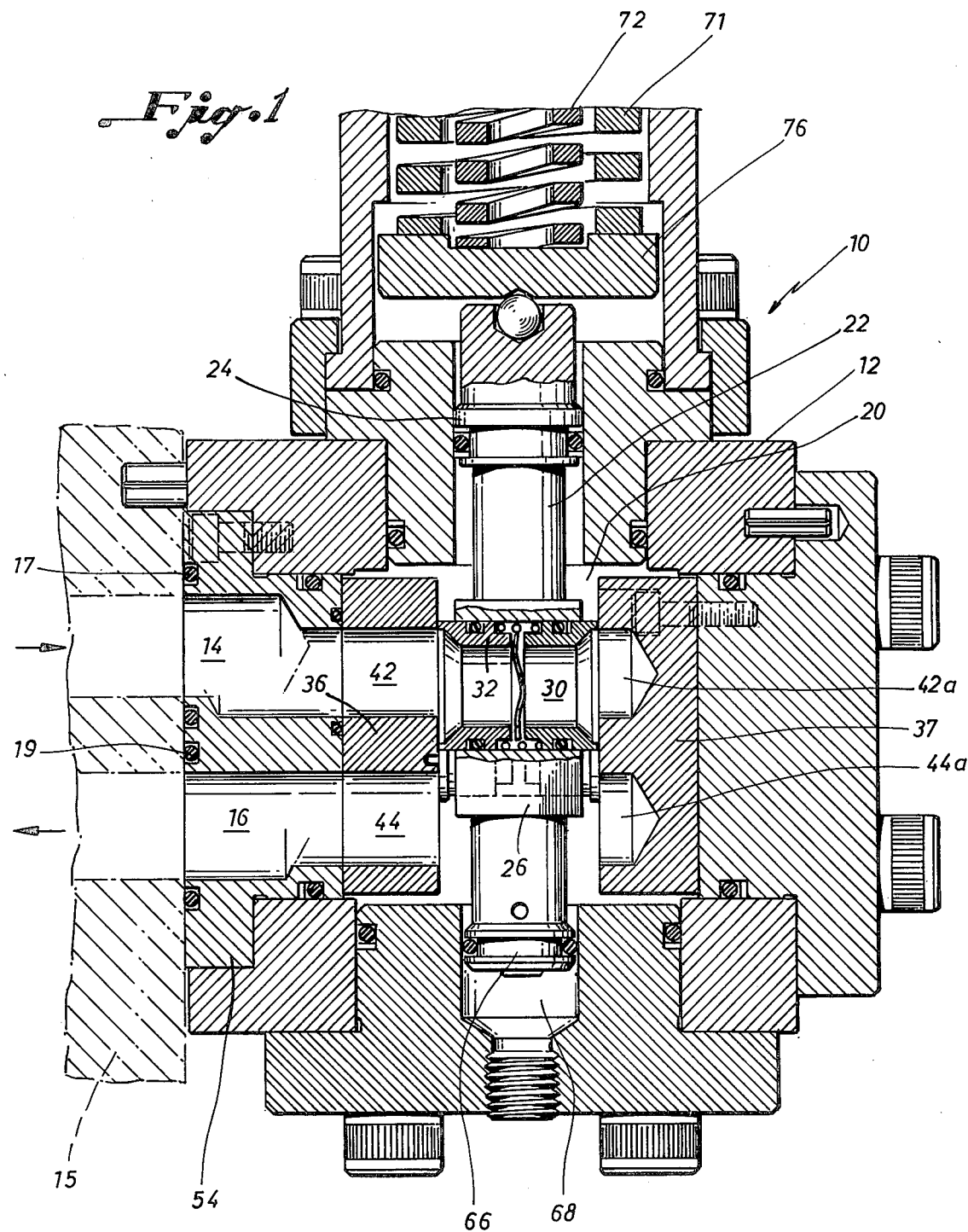
FIG. 1 is a fragmentary elevational view, in cross section, of the valve of the present invention shown in the fully closed position.
Figure 4:
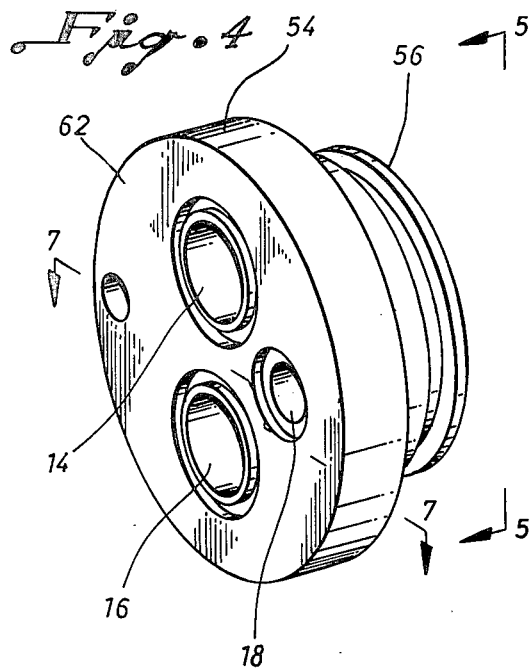
FIG. 4 is a perspective view of the porting plate of the present valve.
Figure 5:
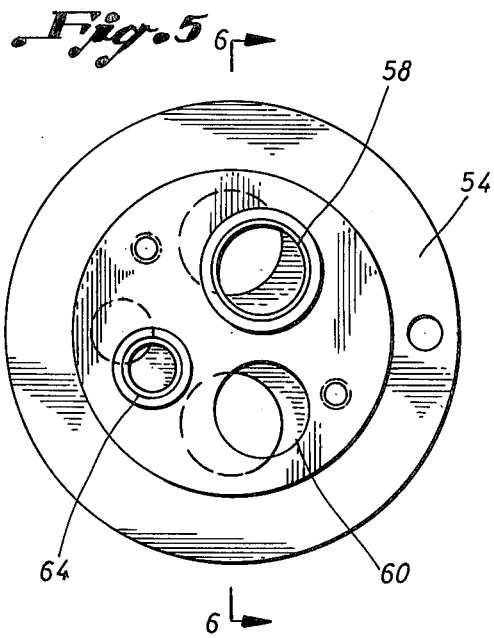
FIG. 5 is an end view taken along the line 5—5 of FIG. 4.
Figure 7:
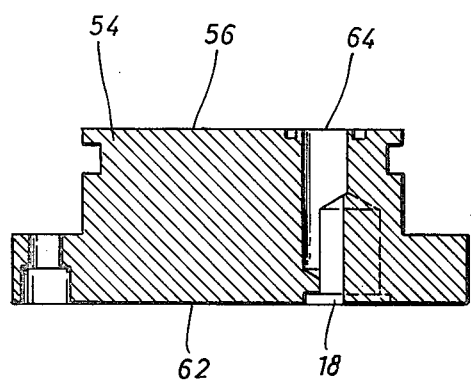
FIG. 7 is a cross-sectional view taken along the line 7—7 of FIG. 4.
Figure 6:
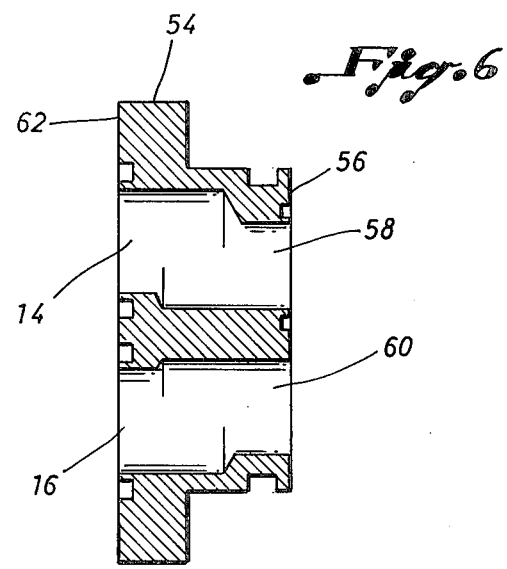
FIG. 6 is a cross-sectional view taken along the line 6—6 of FIG. 5.

Referring now to the drawings, particularly to FIGS. 1, 2 and 3, the reference numeral 10 generally indicates the pressure reducing and regulating valve of the present invention which generally includes a body 12 having a fluid inlet 14 fluid outlet 16 and a vent 18. Generally, a hydraulic pressure supply source is connected to the inlet 14 and a hydraulic pressure is supplied at the outlet 16 which is reduced and regulated. The body 12 has a cavity 20, a plunger 22 movable in the body 12 and a piston 24 connected to the plunger 22 and exposed to the pressure in the body cavity 20.

A seal container 26 is connected to the plunger 22 and is movable in the body cavity 20 about its central axis 28. The seal container 26 includes a first primary opening 30 which is offset from the central axis a distance X. A sliding seal 32 is positioned in the opening 30. The sliding seal is a conventional type hydra seat seal having two tubular members which are spring loaded outwardly to sealingly engage at least one flow plate 36 and preferably a second flow plate 37 which are positioned in the body 12 on opposite sides of the seal container 26.

The container 26 includes a vent opening 48 therethrough with a circular sliding hydra seal 50 in the opening 48. The vent opening 48 is offset from the central axis 28 a distance Y. In conventional valves, the primary opening 30 and the vent opening 48 are aligned one below the other along the central axis 28. However, this requires that the size of the container 26 and consequently the body 12 be sufficient to accommodate the diameters of the openings 30 and 48 as well as the stroke of the container plate 26. In the present container plate 26 with the openings 30 and 48 offset from the central axis 28 on opposite sides the size of the container 26 and thus of the body 12 is minimized thereby reducing the total pressure forces in the body cavity 20 which must be contained by the body 12 and its seals. This is particularly advantageous as it reduces the size, weight and cost of the valve 10 and makes the valve 10 particularly adapted to be face mounted on a subplate 15 (FIG. 1) by O-rings 17 and 19 instead of using a valve having piping ports. This allows ease of service of the valve 10 and quick changeout of the valve 10 with a minimum of down time when repairs are made.

Figure 8:
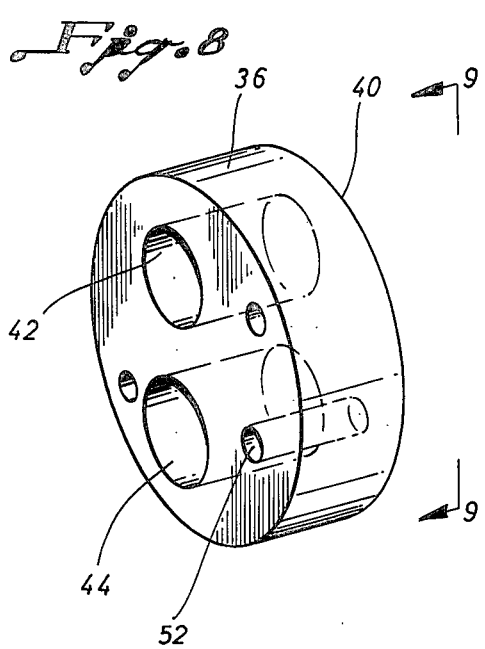
FIG. 8 is a perspective view, of one of the flow plates in the valve.
Figure 9:
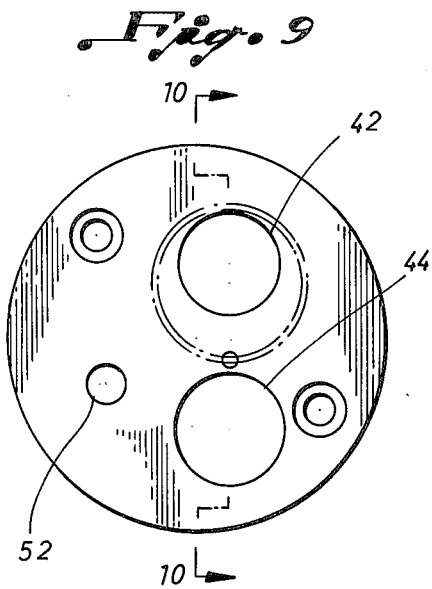
FIG. 9 is an end view taken along the line 9—9 of FIG. 8.
Figure 10:
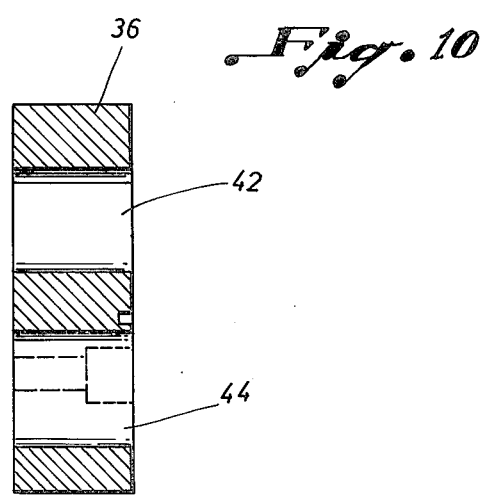
FIG. 10 is a cross-sectional view taken along the line 10—10 of FIG. 9.

The flow plates 36 and 37 are similar and flow plate 36 is best seen in FIGS. 8–10. The flow plate 36 has a face 40 which engages the sliding seals 32 and 50 and includes an inlet port 42 therethrough which communicates with the body cavity 20. Plate 37 includes a port 42a which need not be entirely through the plate 37 but which communicates with the body cavity 20. As best seen in FIG. 1, communication of the inlet ports 42 and 42a with the body cavity 20 is closed when the opening 30 of the seal container 26 is aligned with the inlet ports 42 and 42a and sealed off by the sliding seal 32.

The flow plate 36 includes an outlet port 44 communicating with the body cavity 20 and also communicating with the inlet port 42 when the first opening 30 is moved to overlap both the inlet port 42 and the outlet port 44. Again, the flow plate 37 includes an opening 44a which need not extend entirely through the flow plate 37. As described in my copending patent application Ser. No. 339,554, it is noted that the present structure increases the flow path between the inlet port 14 and the outlet port 16 as the incoming fluid flows not only from the port 42 through the opening 30 and into the ports 42a and 44a and into the body cavity 20 for returning to the port 44, but in addition flows out of the port 42 directly into the body cavity 20 and around the seal container 26 for entering port 44.

The flow plate 36 includes a vent port 52 in communication with the body cavity 20 extending through the flow plate 36. Flow plate 37 includes an opening 52a which need not extend through the flow plate 37. The vent ports 52 and 52a are closed when the opening 48 in the container 26 is aligned with the vent ports 52 and 52a. However, as best seen in FIG. 2, when the seal container 26 has moved upwardly, the sliding seal 50 has uncovered the vent ports 52 and 52a allowing venting of fluid pressure from the body cavity 20 through the vent port 52 directly from the body cavity 20.

Referring now to FIGS. 1, 2 and 4–7, a porting plate 54 is provided having a first side 56 connected to the flow plate 36. The first side 56 of the porting plate 54 has a first inlet passageway 58 connected to the first inlet port 42 of the flow plate 36. In addition, the first side 56 has a secondary passageway 60 connected to the outlet port 44 of the flow plate 36. The second side 62 of the porting plate 54 has an inlet port 14 and an outlet port 16. In addition, the porting plate 54 includes a vent passageway 64 in the face 56 connected to the vent port 52 in the flow plate 36. The second side 62 of the porting plate 54 includes vent outlet 18 connected to the vent passageway 64.

Referring now to FIGS. 1 and 2, a guide and dampener 66 is connected to the bottom of the seal container 26 and is movable in a dampening cavity 68 for dampening rapid movements of the container 26 and guiding and supporting the seal container 26.

As best seen in FIG. 1, the fluid pressure in the cavity 20 acts against the bottom of the piston 24 in a direction to move the carrier 26 upwardly to reduce the regulated pressure in the outlet port 16. Suitable actuating means, which will be more fully described hereinafter, acts on one or more springs 72 and 71 against the top of the plunger 22 to increase the regulated pressure in the outlet 16. As previously described in connection with FIG. 3, it is advantageous to offset the primary seal 32 from and on one side of the central axis 28 while the vent seal 50 is offset from and on the opposite side of the central axis 28 of the seal container 26. However, the hydra seat seals 32 and 50 create a drag force against the flow plates 36 and 37 as they are moved. That is, the seals are spring energized outwardly and a pressure differential acts on the shear seals increasing the force resisting a sliding action between the seals 32 and 50 and the flow plates 36 and 37. The primary seal 32 is acted on by a differential pressure between the fluid pressure in the inlet 14 and the regulated fluid pressure in the outlet 16. The vent seal 50 is acted on by a differential pressure between the secondary regulated pressure in the cavity 20 and the atmospheric pressure in the outlet 18. The drag of the primary seal 32 is generally greater than the drag of the vent seal 50 since the seal 32 is larger, its differential seal area is larger, and the pressure differential between the maximum inlet fluid supply and the lower regulated pressure is high as compared to the pressure differential on the vent seal 50. The seal drags of both the primary seal 32 and of the vent seal 50 create side moments around the central axis 28 as the seal container 26 is moved either upwardly or downwardly thereby creating side loading on the plunger 22 which increases friction and reduces the sensitivity of the valve 10.

The effect of the drag of the seals 32 and 50 on the side plates 36 and 37 is best shown in the schematic diagrams of FIGS. 12A and 12B. In 12A the plunger 22 is being moved upwardly as indicated by the arrow 80 creating a downward drag as indicated by the arrow 82 caused by the engagement of the primary seal 32 with the flow plates 36 and 37. A smaller drag as indicated by the arrow 84 is created by the vent seal 50 riding against the flow plates 36 and 37. The drag 82 creates a moment acting in the direction as indicated by arrow 86 and the drag 84 creates a moment acting in the direction on the container 26 as indicated by the arrow 88. The moment 86 acts around a distance X and the moment 88 acts around a distance Y. In the present invention, the primary seal 82 and the vent seal 50 are placed on opposite sides of the axis 28 at the distances of X and Y, respectively, for reducing the side loading forces caused by the seals acting around the central axis 28 as the container 26 is moved. That is, generally the drag 82 of the primary seal 32 is greater than the drag 84 of the vent seal 50 and therefore the distance Y of the vent seal 50 from the axis 28 is greater than the offset distance X of the primary seal 32 in order to offset or compensate for the effects of monuments 86 and 88. FIG. 12B illustrates the various drags and created moments and their directions when the plunger 22 is moved in the downward direction 80b.

In one particular use of the valve 10 for controlling blowout preventers, the primary inlet pressure is 3000 pounds while the maximum desired secondary pressure is 1500 psi. Of course, the moments 86 and 88 will not be exactly balanced under all operating conditions since the regulated secondary pressure will vary and thus the amount of drag will vary. It is preferable to make the offset distances X and Y to provide a balance when the pressure at the secondary or outlet port 16 is the mean regulated pressure. In this particular example, the mean regulated pressure is 1000 psi.

It is important to reduce the side loading effect which creates increase friction in the valve 10 as any friction creates a "dead band" in the responsiveness of the valve 10 as the valve actuating mechanism must overcome the friction before the differential actuating forces can move the container 26.

Figure 11:
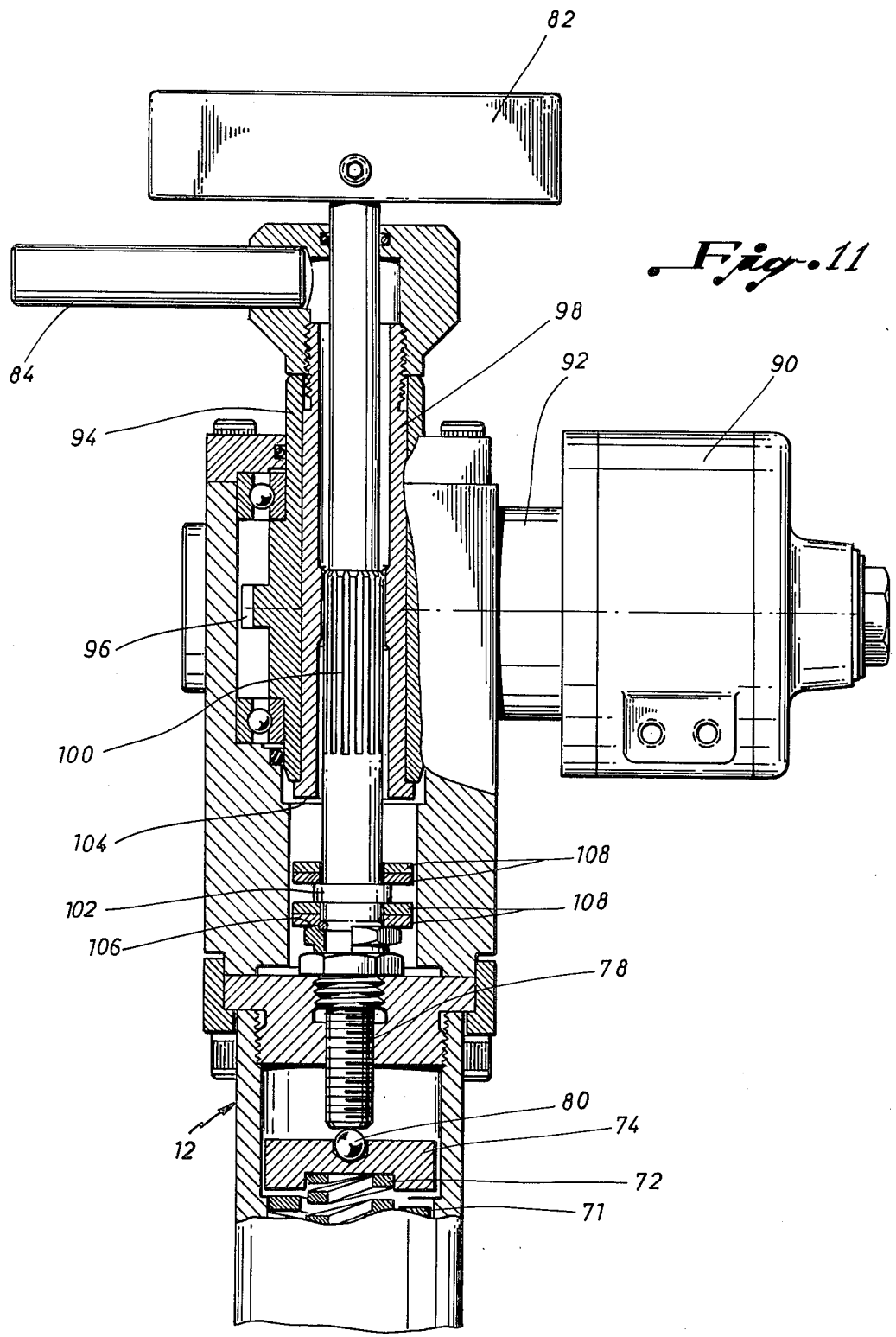
FIG. 11 is a fragmentary elevational view, partly in cross section, of one type of valve actuating mechanism.

Various types of operating mechanisms may be used to provide the desired pressures at which the valve 10 reduces and regulates the flow between the inlet 14 and the outlet 16. Referring now to FIGS. 11 and 1, a combined manual operating and power operating mechanism is shown. Spring means such as one or more compression springs 71 and 72 may include an upper plate 74 and a lower plate 76 positioned at opposite ends of the spring means 71 and 72. The spring means 71 and 72 act in a direction against the plunger 22 to move the seal container 26 downwardly to increase the fluid flow through the valve 10. An adjustment screw 78 acts through the body 12 against a ball 80 in the upper plate 74 to adjust the compression of the springs 71 and 72. Adjustment screw 78 may be manually rotated by a handle 82 to vary the compression in the springs 71 and 72. A lock lever 84 is provided for locking the adjustment screw 78 to the body 12 after the desired adjustment is made. The above described manual operation is generally conventional. As an additional operating means or as an alternative operating means, the valve 10 may be power operated. Thus a motor 90 which may be either pneumatic, hydraulic or electric, may be utilized and will quickly and remotely drive the adjustable screw 78 for adjusting the regulated pressure of the valve 10. The motor 90 drives a gear box 92 which in turn drives a mandrel 94 by a gear 96. The mandrel 94 may be locked to a sleeve 98 by means of the lever lock 84 for driving. A spline connection 100 is provided between the sleeve 98 and the adjusting screw 78. Therefore, when the lever 84 is locked and the motor 90 is actuated, the adjustable screw 78 is rotated.

However, in operating the adjustable screw 78 in any mode, it is important that the adjustable screw 78 be able to be reversed when it is driven or screwed to the limit of its travel. That is, the screw includes a shoulder 102. When the screw 78 is moved upwardly, the shoulder 102 will normally contact an upper stop 104 at the upward extent of travel of the screw 78. Similarly, when the screw 78 is driven downwardly, the shoulder 102 will normally contact a stop shoulder 106 on the body 12. However, it is well known that it will generally require a greater force to back the shoulder 102 off from one of the stops 104 or 106 than is required to drive it into engagement with one of the stops 104 or 108. And in fact, the shoulder 102 can be driven into a binding and jammed contact with the shoulders 104 or 106.

Therefore, another feature of the present invention is the provision of a back-off for insuring that the shoulder 102 can be retracted from stop shoulders 104 or 106 in the event that the adjusting screw 78 is driven into engagement with the body at the limit of its travel. Therefore, one or more metal washers 108 and preferably two are provided around the screw 78 on each side of the shoulder 102. The metal washers 108 are coated with a low friction material, such as a fluorocarbon material sold under the trademark "Teflon". The low friction fluorocarbon material allows the adjusting screw 78 to be more easily backed off of a stop shoulder 104 or 106. The metal insert insures the strength integrity of the washers as they are jammed between coacting shoulders.

The present invention, therefore, is well adapted to carry out the objects and attain the ends and advantages mentioned as well as others inherent therein. While a presently preferred embodiment of the invention is given for the purpose of disclosure, numerous changes in the details of construction and arrangement of parts, will readily suggest themselves to those skilled in the art and which are encompassed within the spirit of the invention and the scope of the appended claims.

What is claimed is:

1. In a pressure reducing and regulating valve having, a body having a body cavity, a seal container movable in the cavity, said container having primary and vent seals, at least one flow plate in the body positioned adjacent the container and having primary, secondary and vent ports, the improvement in seal container comprising, said primary and vent seals positioned on the container on opposite sides of the central axis of the container thereby allowing the container to be of a smaller size thereby reducing the pressure forces applied against the interior of the body, and said primary and vent seals spaced on opposite sides of the central axis at locations for reducing the side loading forces of the seals acting around the central axis as the container is moved.

2. The apparatus of claim 1 including,
a second flow plate in the body positioned adjacent the container on the side opposite the one flow plate and having primary, secondary and vent ports.

3. The apparatus of claim 1 including,
a port plate mating with a flow plate having ports communicating with the ports in the flow plate,
the outer face of the port plate having face seals for subplate mounting.

4. The apparatus of claim 1 wherein the vent seal is spaced further from the central axis of the container than the primary seal.

5. The apparatus of claim 4 wherein the vent seal and primary seal are spaced from the central axis distances which provide balanced side loading moments when the pressure at the secondary port is the mean regulated pressure.

6. The apparatus of claim 1 including,
spring means acting against the container in a direction to increase the fluid flow through the valve,
an adjustable screw engaging said spring means for adjusting the compression in said spring means,
a shoulder on said screw positioned to engage the body at each end of travel in opposite directions, and
a metal washer on each side of the shoulder coated with a low friction material whereby the shoulder can be easily backed off from its engagement with the body.

7. The apparatus of claim 6 including,
an additional metal washer on each side of the shoulder coated with a low friction material.

8. In a pressure reducing and regulating valve having a body with a body cavity, a seal container movable in the cavity, said container having primary and vent seals, at least one flow plate in the body positioned adjacent the container and having primary, secondary and vent ports, the improvement comprising,
spring means acting against the container in a direction to increase the fluid flow through the valve,
an adjustable screw engaging said spring means for adjusting the compression in the spring means,
a shoulder on the screw positioned to engage the body at each end of travel in opposite directions, and
a metal washer on each side of the shoulder coated with a low friction material whereby the shoulder can be easily backed off from its engagement with the body.

9. The apparatus of claim 8 including,
an additional metal washer on each side of the shoulder coated with a low friction material.

10. The apparatus of claim 9 wherein the low friction material is a plastic.

* * * * *